(12) United States Patent
Trishaun (10) Patent No.: US 10,528,778 B2
(45) Date of Patent: Jan. 7, 2020

(54) HANDHELD RFID READER AND RELATED SYSTEMS AND METHODS

(71) Applicant: Marquette Trishaun, Fulton, GA (US)

(72) Inventor: Marquette Trishaun, Fulton, GA (US)

( * ) Notice: Subject to any disclaimer, the term of this patent is extended or adjusted under 35 U.S.C. 154(b) by 0 days.

(21) Appl. No.: 15/916,881

(22) Filed: Mar. 9, 2018

(65) Prior Publication Data

US 2018/0260592 A1    Sep. 13, 2018

Related U.S. Application Data

(60) Provisional application No. 62/469,793, filed on Mar. 10, 2017.

(51) Int. Cl.
| | |
|---|---|
| *G06K 7/08* | (2006.01) |
| *G06K 7/10* | (2006.01) |
| *H01Q 1/22* | (2006.01) |
| *H04B 1/38* | (2015.01) |
| *H01Q 7/00* | (2006.01) |
| *H04B 1/3888* | (2015.01) |

(52) U.S. Cl.
CPC ..... *G06K 7/10386* (2013.01); *G06K 7/10009* (2013.01); *G06K 7/10316* (2013.01); *G06K 2007/10524* (2013.01); *H01Q 1/2216* (2013.01); *H01Q 7/00* (2013.01); *H04B 1/38* (2013.01); *H04B 1/3888* (2013.01)

(58) Field of Classification Search
USPC .............. 235/385, 451, 492, 462.46, 472.01, 235/472.02
See application file for complete search history.

(56) References Cited

U.S. PATENT DOCUMENTS

| | | | | |
|---|---|---|---|---|
| 6,025,803 | A * | 2/2000 | Bergen | H01Q 1/246 343/700 MS |
| 8,629,812 | B2* | 1/2014 | Jaffri | H01Q 13/18 343/767 |
| 2003/0222142 | A1* | 12/2003 | Stevens | G06K 17/0022 235/385 |
| 2007/0075142 | A1* | 4/2007 | Bellows | G06F 1/1613 235/451 |
| 2007/0096919 | A1* | 5/2007 | Knadle, Jr. | B66F 9/0755 340/572.8 |
| 2008/0048863 | A1* | 2/2008 | Copeland | G06K 19/0726 340/572.1 |
| 2013/0134226 | A1* | 5/2013 | Chen | G06K 19/0723 235/492 |
| 2013/0311314 | A1* | 11/2013 | Fernando | G06K 7/01 705/17 |

(Continued)

*Primary Examiner* — Tuyen K Vo
(74) *Attorney, Agent, or Firm* — Allen, Dyer, Doppelt + Gilchrist, PA (57) ABSTRACT

A handheld RFID reader may include a housing, an RF antenna carried by the housing, and an RF transceiver carried the housing and being coupled to the RF antenna. The handheld RFID reader may include a controller carried by the housing and being coupled to the RF antenna and the RF transceiver, a communication interface carried by the housing and coupled to the controller, and a mobile wireless communications device carried by the housing and coupled to the communication interface. The mobile wireless communications device may be configured to cooperate with the controller to receive data from an RFID device via the RF antenna.

20 Claims, 8 Drawing Sheets

(56) References Cited

U.S. PATENT DOCUMENTS

| | | | |
|---|---|---|---|
| 2014/0019241 A1* | 1/2014 | Treiser | G06Q 30/0609 705/14.53 |
| 2014/0306807 A1* | 10/2014 | Rowland | H04Q 9/00 340/10.3 |
| 2015/0053764 A1* | 2/2015 | Pachler | A47J 31/4492 235/439 |
| 2017/0004336 A1* | 1/2017 | Lim | G06K 7/10009 |

* cited by examiner

HANDHELD RFID READER AND RELATED SYSTEMS AND METHODS

RELATED APPLICATION

This application is based upon prior filed Application No. 62/469,793 filed Mar. 10, 2017, the entire subject matter of which is incorporated herein by reference in its entirety.

TECHNICAL FIELD

The present disclosure relates to the field of communications, and, more particularly, to radio frequency tag readers and related methods.

BACKGROUND

Passive RFID tags provide adequate localization of a tagged asset when the reader can come into close proximity with the items being scanned. However when a large number of tags are in question, RFID scanners can create a huge choke point or bottleneck in attempting to scan multiple tags in a moderate time frame. Furthermore depending on the efficacy of the scan technique, there is a large possibility of miscounting the tagged assets. This is where active tags that beacon at a periodic data rate have the advantage. Active tags eliminate the choke point by broadcasting the radio waves over several meters and at a periodic data rate which allows for multiple hits on target as evidenced by the reader. The broad range of the active tag in turn makes it difficult to localize to a specific set of tags in one region (i.e. a storage bin) versus other tags in the general vicinity.

SUMMARY

Generally, a handheld radio frequency identification (RFID) reader may comprise a housing, an RF antenna carried by the housing, an RF transceiver carried the housing and being coupled to the RF antenna, and a controller carried by the housing and being coupled to the RE antenna and the RF transceiver. The handheld REID reader may also comprise a communication interface carried by the housing and coupled to the controller, and a mobile wireless communications device carried by the housing and coupled to the communication interface. The mobile wireless communications device may be configured to cooperate with the controller to receive data from an RFID device via the RE antenna. Advantageously, the handheld RFID reader provides are robust and versatile REID device.

Also, the RE antenna may comprise a circle-shaped antenna. In some embodiments, the communication interface comprises a wired communication interface. In other embodiments the communication interface comprises a wireless communication interface.

The RF antenna may be carried by an external surface of the housing. The housing may define a device recess configured to receive the mobile wireless communications device. The housing may comprise a pistol style grip opposing the device recess. The mobile wireless communications device may be configured to communicate with an external database for storing the received data.

Another aspect is directed to a communication system comprising a server, and a handheld RFID reader. The RFID reader may include a housing, an RE antenna carried by the housing, an RF transceiver carried the housing and being coupled to the RF antenna, and a controller carried by the housing and being coupled to the RF antenna and the RF transceiver. The handheld RFID reader may also comprise a communication interface carried by the housing and coupled to the controller, and a mobile wireless communications device carried by the housing and coupled to the communication interface. The mobile wireless communications device may be configured to cooperate with the controller to receive data from an RFID device via the RF antenna, and communicate with an external database in the server for storing the received data.

Yet another aspect is directed to a method of making a handheld RFID reader. The method comprising forming an RF antenna carried by a housing, coupling an RF transceiver, carried the housing, to the RF antenna, and coupling a controller, carried by the housing, to the RF antenna and the RE transceiver. The method may include coupling a communication interface, carried by the housing, to the controller, and coupling a mobile wireless communications device, to be carried by the housing, to the communication interface, the mobile wireless communications device being configured to cooperate with the controller to receive data from an REID device via the RF antenna.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

It is desired to be able to scan an active tags with the directionality of passive tags without sacrificing range and the ability to quickly count and sort large amounts of assets. To address these problems an Internet of Things (IoT) based scanning approach is desirable. Using an 'always connected' sensor that supports remote access and configuration over a network allows users to monitor conditions and receive real-time alerts while away from the vicinity. Furthermore, a host sensor capable of reading other smart devices and sensors allows for a mesh network of smart devices. Such a network expanding the area and conditions under monitor less daunting.

In the present invention, a directional reader for an active RFID tag is formed using multiple antennas capable of pairing with multiple radio protocols and communication standards. Information gathered has backbone access through existing network infrastructure for record storage in secure databases. Localized software paired with the reader provides flexibility for parameter configurations as well as visual usefulness of active data acquired.

Multiple antennas are paired with radio protocols for standard radio communication. A directional antenna is combined with various other antenna form factors linked to a standard radio communication protocol. The combination of antennas allows for the readability of active RFID tags from a specific direction.

Information attained through the reader from an active RFID tag has access through backbone infrastructure through existing network protocols. The access to existing network infrastructures allows data storage and sharing flexibility. Data from the active RFID tags can be stored to a secured database of database of choice.

The reader is paired with software for configuration and data display purposes. The software is not limited to any form of operating system and can exist local or in remote proximity to the reader i.e. laptop, smartphone. Parameters with be configurable in the software both as to the functionality of the reader and the data displayed by an active RFID tag.

Figure 1:
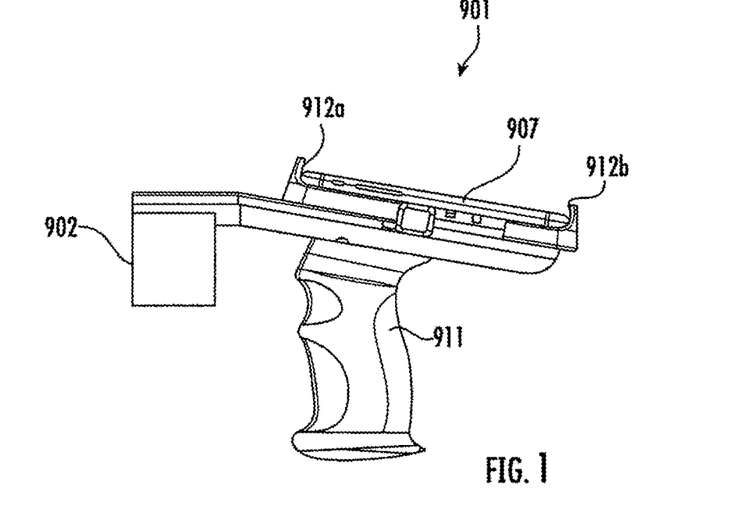
FIG. 1 is a schematic view of a directional scanner housing design/assembly, according to the present disclosure.

With Reference to FIG. 1, the universal reader unit assembly contains the communication system used for communicating with companion smart sensor devices. The wireless link shall support the Bluetooth, UHF/VHF and LTE communication protocol. The chosen antenna and RF substrate are fully compatible with all competing lower-power standards/communication radios. Communications with companion sensor units shall be provided using Bluetooth or Wi-Fi communication standards. Transmissions from portable sensor shall include the nature of the event which prompted the exchange along with sensor data such as captured images or battery status. Information received from the sensor unit shall be relayed to the companion web server and user web app. Physical buttons may be included for toggling of unit and radio power, device pairing, etc. Continuous wave radar senses vitals through phased array antenna. Aided by support vector machine classifiers, vital data abnormalities can be detected and more aware to user. Primary power can be received from standard outlets or powered via building electrical network in wall or ceiling mounting applications. Backup power sources are charged via the primary power sources while in use, backup may also make use of solar energy harvesting methods to obtain charge. All components discussed are contained within the unit housing. The housing features a rugged and durable design in addition to being sealed to prevent tampering.

Figure 2:
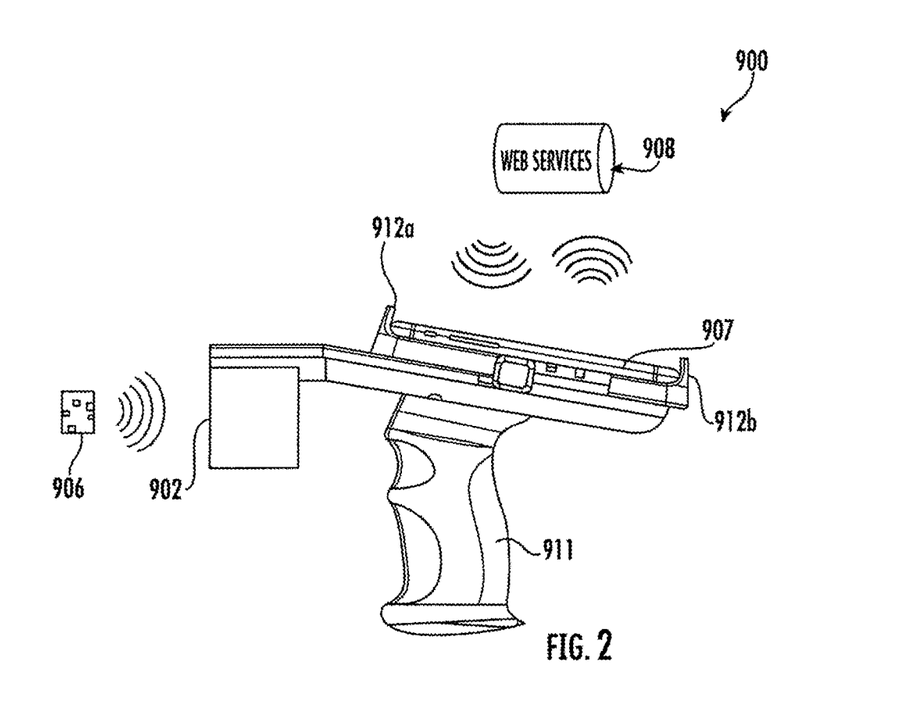
FIG. 2 is a schematic view of reader communication with companion sensors and web services, according to the present disclosure.

With reference to FIG. 2, the Multi-Modal Reader is capable of wireless communication with a host of companion sensors and web/cloud services. Communication with smart sensors allows the Multi-Modal reader to receive data such as companion sensor battery life, proximity based alerts, and biometric data based on the sensors deployed and the needs of the user. Pertinent data can be sent to the user through the use of web technologies and services. Internet connectivity also allows for remote monitoring and configuration of devices paired with the Multi-Modal Reader.

Figure 3:
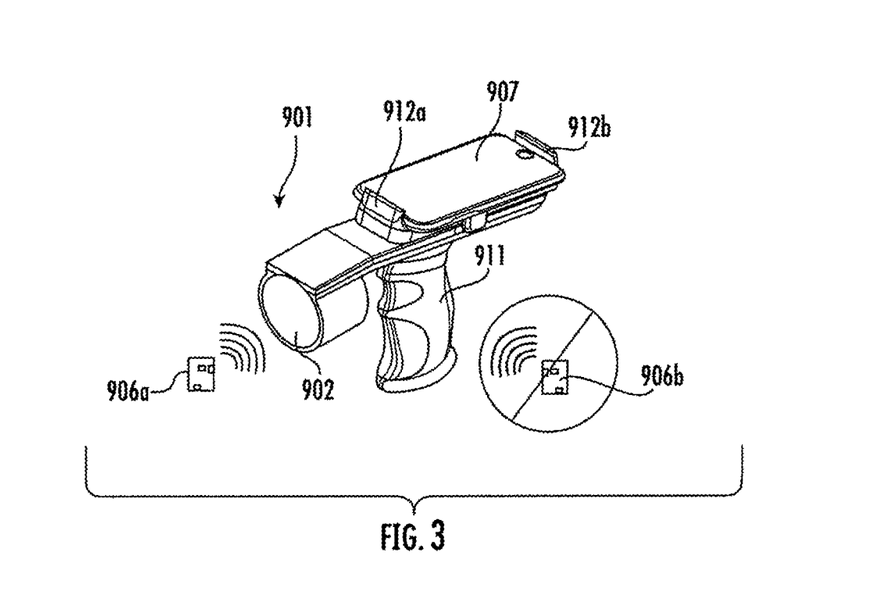
FIG. 3 is a schematic view of RFID Tag detection/rejection, according to the present disclosure.

With reference to FIG. 3, the Multi-Modal Reader features personnel identification capabilities though reading from connected devices. Personnel in the vicinity wearing Bluetooth or RF tags can be identified through the unique signatures used by each protocol. In the case of Bluetooth, devices have an QUID or Universally Unique ID used to discern each tag. Such tags can be worn on personnel. Additional methods of personnel ID make use of Wi-Fi. Personal devices such as cellular phones with Wi-Fi enabled passive listen for access points to share availability information with nearby devices, upon finding an access point broadcast request are sent to the access point. During both processes identifiers such as device hostname and MAC address are shared. The multi-modal nature of the reader allows for scanning as both a host access point or non-host device in search of a network.

Figure 5:
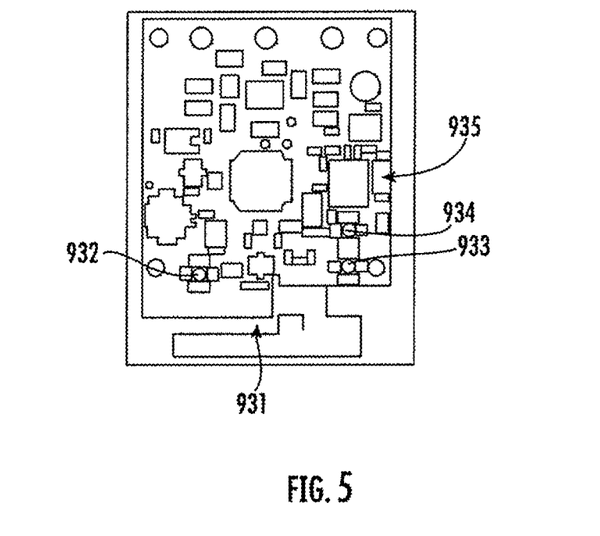
FIG. 5 is a schematic view of companion reader/antenna architecture for a meshed geofenced application, according to the present disclosure.

Referring to FIG. 5, the sensor is capable of breather-detection using the continuous wave radar where the microprocessor commands the synthesizer to sweep a 3% bandwidth from a nominal carrier at a constant PRF rate. The waveform is transmitted using a patch antenna and the Doppler reflections are received via a circulator or four-port coupler 935 for processing using a software defined radio in the processor. Such a method will be used to detect a possible distress signal from a sleeping infant.

The companion reader is intended to assist with geofencing and localized reads to within a sub region of a larger building. To facilitate this mode, multiple antennae is used on the said reader to eliminate false reads due to multipath and other signals picked up from outside the room. The onboard path antenna scans the power emanating from a tag, the reader then switches to an off-board antenna that is cavity backed to beam form and pickup any signals emanating from behind the reader, the third off-board antenna directs for power emanating from side lobes or any other energy causing reflections into the main antenna beam. An onboard algorithm weights the strength of main antennae against the reflection antennae and returns a positive read if the RSSi value weights higher than the root-sum-square of the other antennae. By locating the antennae off-board, customized RF solutions can take into account unique features of certain building structures.

A monitoring device, comprising: A sensor, said sensor detecting at least one vital signature; Identification of persons in proximity; Communication with interfaced wireless sensors; Said wireless sensors transmitting sensor related information to monitoring device; and Wherein said related information and said monitoring device are used to communicate conditions of persons or objects.

An RSSI antennae processing algorithm for localizing tags within a geofenced perimeter. Whereas the said sensor shall be embodied in an electronic circuit assembly/enclosure.

An IoT based monitoring device uses RF technologies to communicate with additional sensors to determine conditions of persons of objects in an environment. Multiple modal nature allows for Wi-Fi, cellular, and Bluetooth scanning and broadcasting. Exemplary embodiments include proximity based and biometric based sensors which transmits sensor data to device. Generally, the alerts are generated based on nature of data received. Alerts are recorded on cloud services and may be sent to user via SMS. Additionally, identification via Bluetooth and RF tag reading and cellular MAC and network hostname reading are featured.

Figure 6:
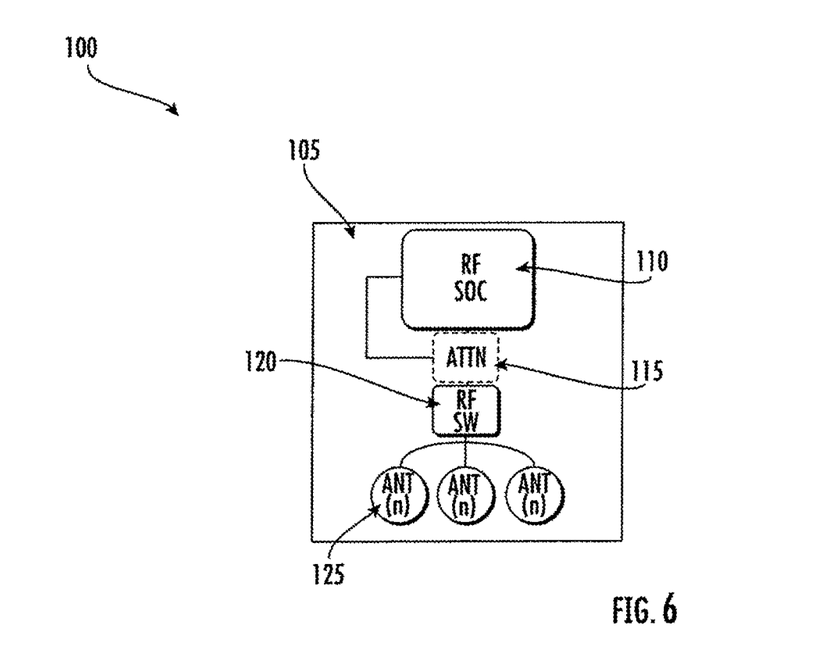
FIG. 6 is a schematic diagram of an RF transceiver in the handheld RFID reader, according to the present disclosure.

Referring to FIG. 6, the radio frequency subsystem 100 comprises an RF system 105 on a chip that handles all of the preprocessing of the active tags but limits this information to a scalar power reading (RSSI). To achieve more granular control of the receive signal in some embodiments, a discretely controlled RF attenuator 115 is placed before the RF switch 120 to add pre-emphasis to signal path emanating from the different antennae, and downstream from an RF transceiver 110. Since the quadrature and phase data is not available to gain context as to the spatial origin of the active tag, the system relies on the ability to scan several antennae 125 with spatial separation to deduce the origins and signal strength with respect to this context.

Figure 7:
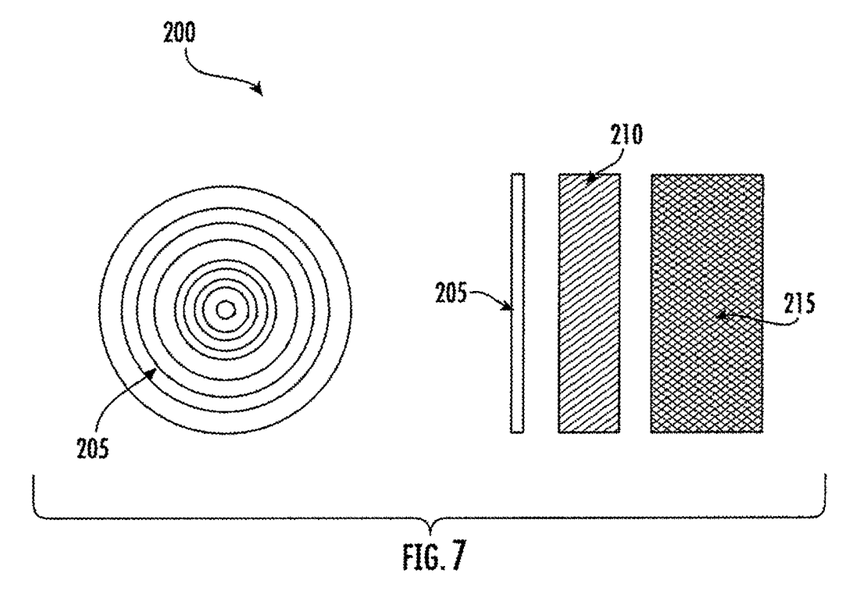
FIG. 7 is a schematic diagram of an RF antenna in the handheld RFID reader, according to the present disclosure.

Referring to FIG. 7, the most dominant antenna element is the forward looking element 200 which must not be susceptible to the effects of the assets orientation. Cross polarization can manifest itself as a tag not being near in proximity due to the more than 30 dB drop off of power based on said cross orientation. Therefore the front element is intended to be a circular polarized antenna 205. In some embodiments where there is a need to be very granular in the location of a tracked asset, a cavity backed 215 antenna is used wherein an RF absorber material 210 is used to dampen the back lobe. In this embodiment the forward looking antenna is both circular polarized and highly directional for looking inside of a local room per se for the tracked asset. Where such granularity is not desired a coplanar circular antenna can be used and still achieve the principal intent of the forward looking element.

Figure 8:
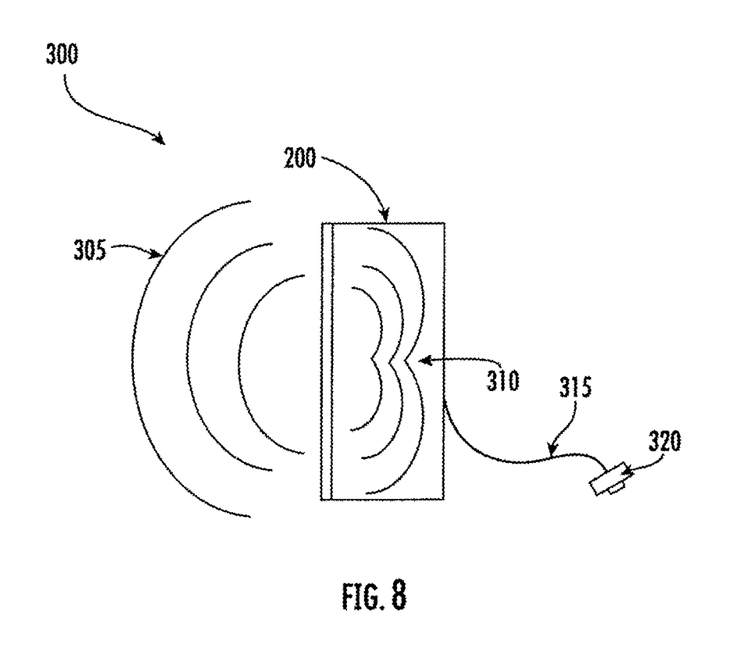
FIG. 8 is a schematic diagram of a beam pattern of the RF antenna in the handheld RFID reader, according to the present disclosure.

Referring to FIG. 8, where the forward looking antenna is desired. The beam pattern 305 emanates from front of the antenna 300 with minimal backscatter. To achieve this, the cavity must be metallic trapping the RF in a faraday cage 310 and the coaxial cable shall be shield and grounded to the cavity 315. In this embodiment, the cavity backed antenna can be collocated away from the main unit via an RF connector 320 for custom applications like assembly line inspect of the moving tracked assets.

Figure 9:
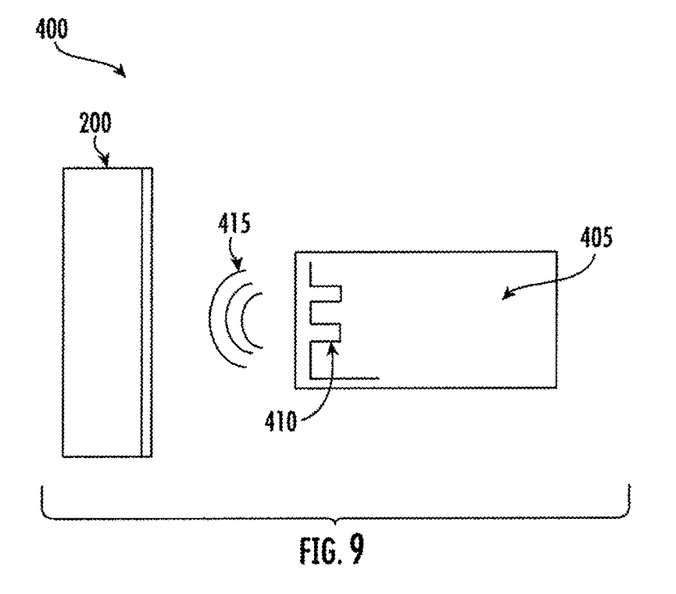
FIGS. 9-11 are schematic diagrams of different embodiments of the handheld RFID reader, according to the present disclosure.

Referring to FIG. 9, by using a circular polarized antennae with a cavity backing, radio frequency pickup 415 from a tracked asset 405 with linear polarized antenna 410 will be very strong directly in front of the said antenna. In the simplest context the directionality of the reader 400 the strongest RSSI will be along this axis regardless of orientation. Multipath rejection is another highly achievable attribute in that the antenna can take on the form of a legacy antenna design known as the skew-planar-wheel.

Figure 10:
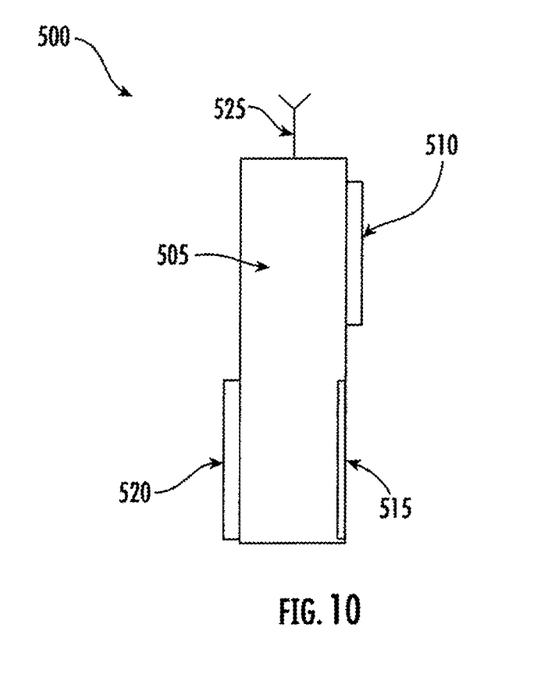
Figure 11:
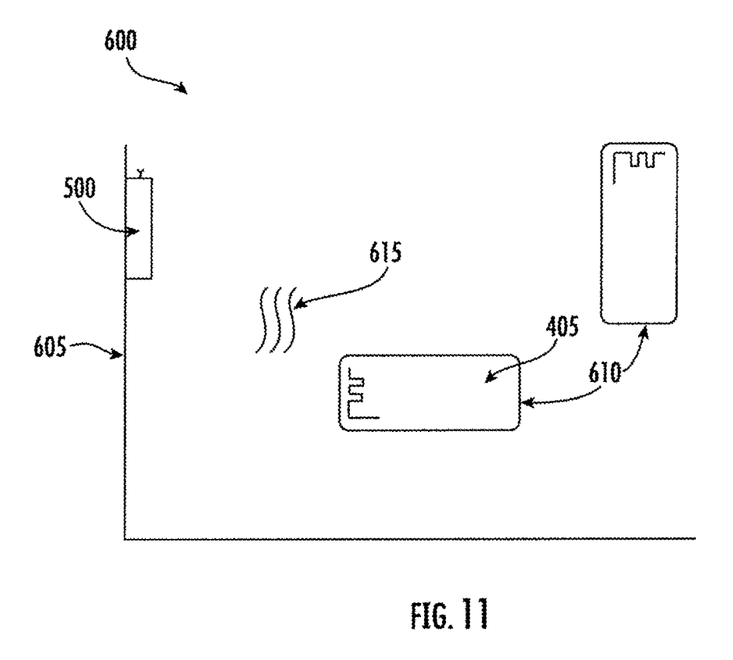

Referring to FIGS. 10-11, in a wall mounted embodiment 500 of the directional reader, the electronic housing 505 is designed to accommodate multiple antenna elements. The onboard coplanar antenna 515 element conducts a wide-sense scan while the forward looking element 510 interrogates further to ascertain if the dominate strength of the tag 405 is emanating from in front of the unit 615. A second forward looking antenna 520 is located on the back of the enclosure and is intended to couple with the wall 605 to eliminate false positives for assets that are outside of the local area. In this embodiment, a simple whip antenna 525 is used to convey the tag data from a sub-tag-reader to a master-tag-reader.

Referring to FIG. 11, in a wall mounted embodiment 500 of the directional reader the electronic housing 505 is designed to accommodate multiple antenna elements. The onboard coplanar antenna element conducts wide-sense scans 515 while the forward looking element 510 interrogates further to ascertain if the dominate strength of the tag emanating from in front of the unit. A second forward looking antenna is locate on the back of the enclosure and is intended to couple with the wall 520 to eliminate false positives for assets that are outside of the local area. In this embodiment, a simple whip antenna 525 is used to convey the tag data from a sub-tag-reader to a master-tag-reader.

Figure 12:
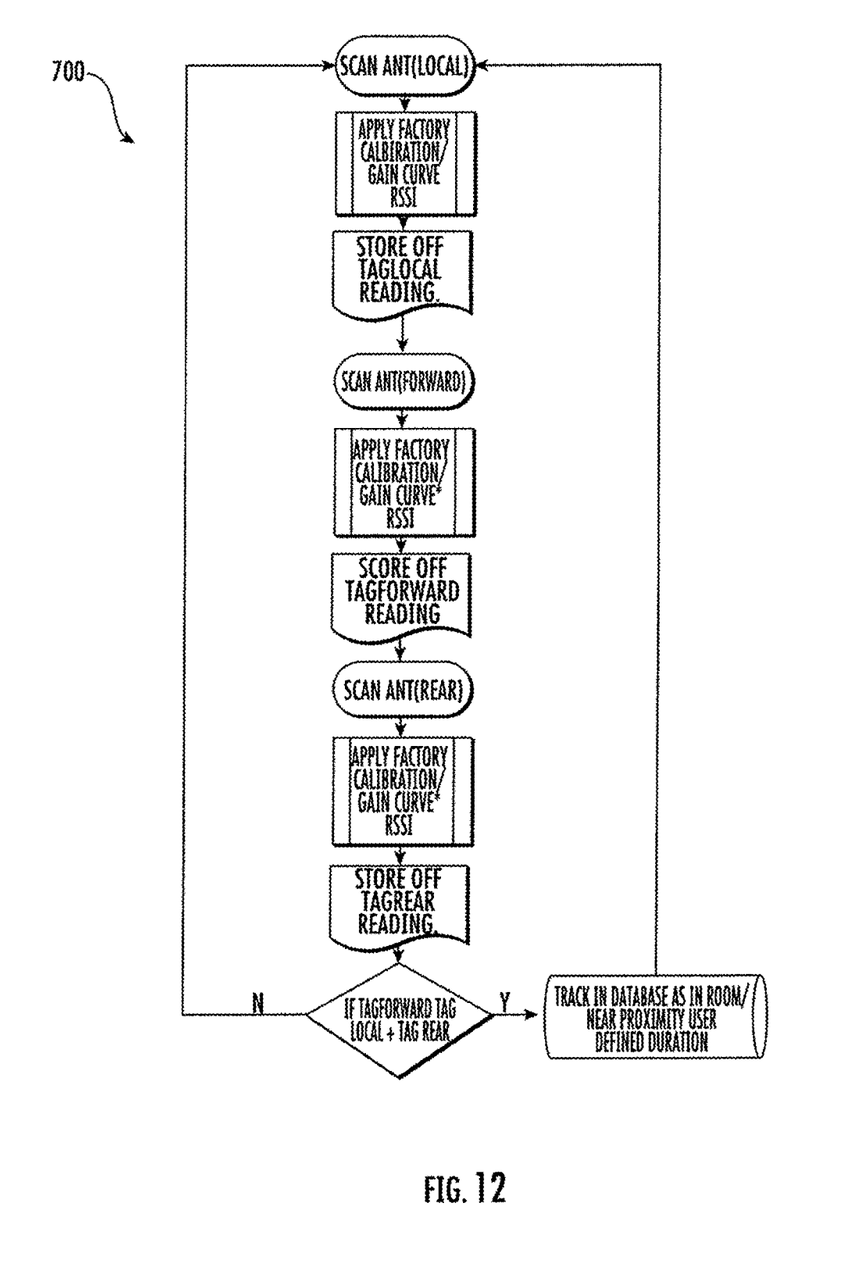
FIG. 12 is a flowchart for operating of the handheld RFID reader, according to the present disclosure.

Referring to FIG. 12, once the tags signal strength is available for processing by the digital signal processing unit (flowchart 700), several locally stored factory calibration factors come into play. Signal path losses from the RF traces, electronic enclosures, and manufacturing variances are studied and analyzed in a controlled laboratory setting. Once the signal is normalized using the stored calibration a simple algorithm that weights the tag strength from the multiple antenna elements can determine if the unit is indeed in front of the directional reader.

Figure 13:
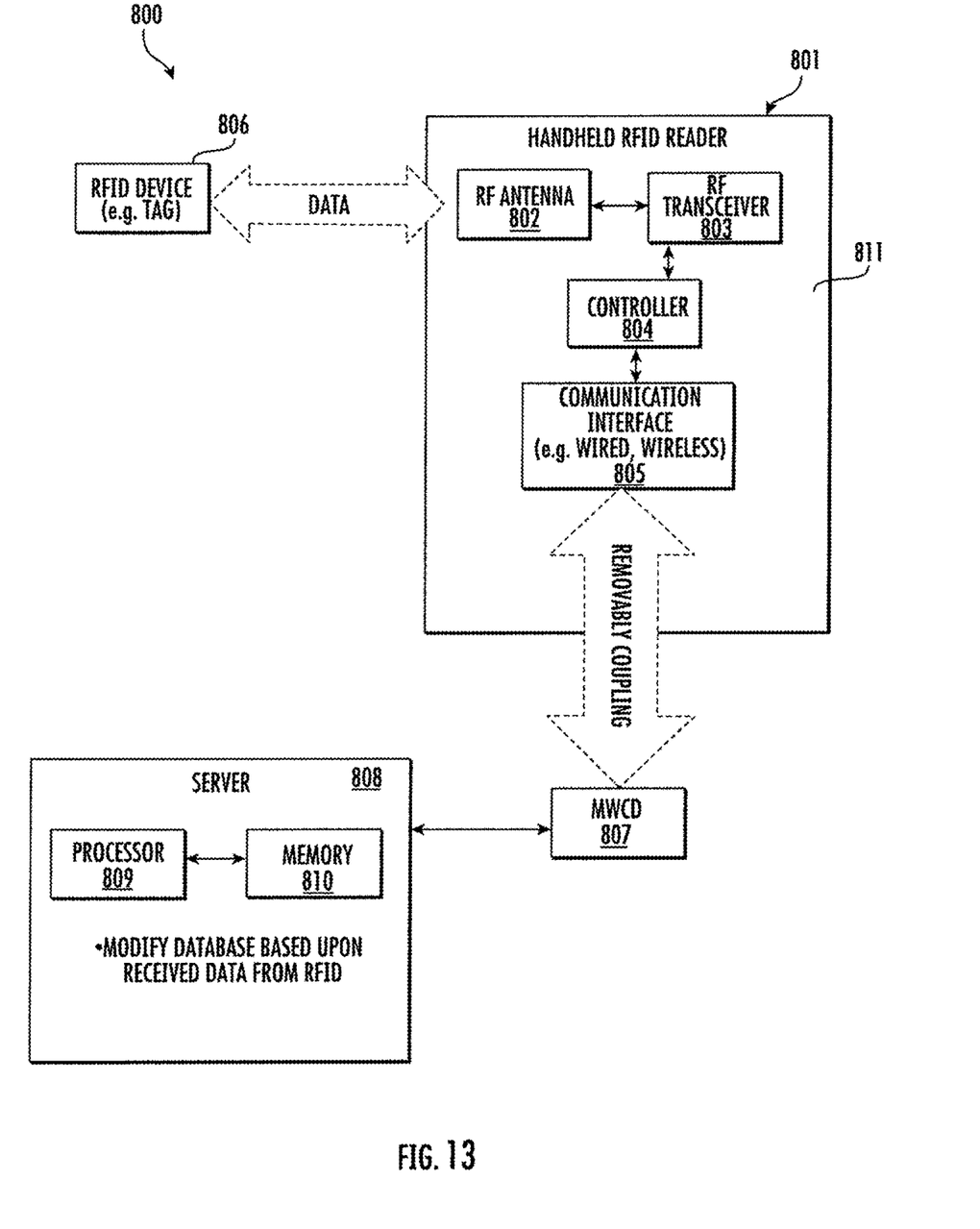
FIG. 13 is a schematic view of a communication system, according to the present disclosure.

Referring to FIG. 13, a communication system 800 according to the present disclosure is now described. The communication system 800 illustratively includes a server 808, a handheld RFID reader 801, and an RFID device 806 (e.g. passive RFID tag, active RFID device). Although only a single handheld RFID reader 801 is shown, the communication system 800 would typically include a plurality of handheld RFID readers and respective users communicating with the server 808.

The server 808 illustratively includes a processor 809, and a memory 810 cooperating therewith. The user of the handheld RFID reader 801 may activate the RFID device 806 and scan it for encoded data. For example, the handheld RFID reader 801 may be used in an inventory application, where the user must scan and register a large number of adjacent RFID devices attached to items being inventoried.

As will be appreciated, the server 808 may comprise a remote computing device in communication with a plurality of handheld RFID readers 801 over a network, such as the Internet. The server 808 may also comprise a virtual server provided via a cloud computing service, such as Amazon Web Services, as available from Amazon.com, Inc., of Seattle, Wash.

The handheld RFID reader 801 illustratively includes a housing 811, an RF antenna 802 carried by the housing, an RF transceiver 803 carried the housing and being coupled to the RF antenna, and a controller 804 carried by the housing and being coupled to the RF antenna and the RF transceiver. The handheld RFID reader 801 illustratively includes a communication interface 805 carried by the housing 811 and coupled to the controller 804, and a mobile wireless communications device 807 removably carried by the housing and coupled to the communication interface. The mobile wireless communications device 807 is configured to cooperate with the controller 804 to receive data from the RFID device 806 via the RF antenna 802, and communicate with an external database in the server 808 for storing the received data.

In some embodiments (FIGS. 1-3), the mobile wireless communications device 807 is a user cellular device temporarily coupled into the handheld RFID reader 801. For example, the handheld RFID reader 801 may include a mechanical locking device, such as a clamp, to couple to the mobile wireless communications device 807. In other embodiments, the mobile wireless communications device

807 would be largely permanently attached to the handheld RFID reader 801, for example, removable only with a tool.

In some embodiments (FIG. 7), the RF antenna 802 may comprise a circle-shaped antenna. The circle-shaped antenna would be configured to emit an RF signal having circular polarization. In other embodiments, the RF antenna may have a spiral-shape, or comprise a whip antenna. As will be appreciated, the RF antenna 802 would need to emit a highly directional RF signal, i.e. one with a low beam width. Helpfully, this permits the user to scan a desired RFID device from among a set thereof in close proximity.

In some embodiments, the communication interface 805 comprises a wired communication interface (e.g. a USB Type-C connection, a Lightening connection, as available from the Apple Corporation of Cupertino, Calif.). In other embodiments, such as the aforementioned embodiment where the mobile wireless communications device 807 is temporarily coupled to the handheld RFID reader 801, the communication interface 805 comprises a wireless communication interface (e.g. Bluetooth, infrared connection, near field communications (NFC)).

Yet another aspect is directed to a method of making a handheld RFID reader 801. The method comprising forming an RF antenna 802 carried by a housing 811, coupling an RF transceiver 803, carried the housing, to the RF antenna, and coupling a controller 804, carried by the housing, to the RF antenna and the RF transceiver. The method includes coupling a communication interface 805, carried by the housing 811, to the controller 804, and coupling a mobile wireless communications device 807, to be carried by the housing, to the communication interface. The mobile wireless communications device 807 is configured to cooperate with the controller 804 to receive data from an RFID device 806 via the RF antenna 802.

Referring now additionally to FIGS. 1-3, another embodiment of the handheld RFID reader 901 is now described. In this embodiment of the handheld RFID reader 901, those elements already discussed above with respect to FIG. 13 are incremented by 100 and most require no further discussion herein. This embodiment differs from the previous embodiment in that this handheld RFID reader 901 illustratively includes the RF antenna 902 carried by an external surface of the housing 911. The housing 911 illustratively includes a device recess 912a-912b configured to receive the mobile wireless communications device 907. The housing 911 illustratively includes a pistol style grip opposing the device recess 912a-912b. The mobile wireless communications device 907 is configured to communicate with an external database for storing the received data. In FIG. 3, the highly effective directional nature of the handheld RFID reader 901 permits reading/activation of a desired RFID device 906a, while not reading/activating an adjacent RFID device 906b. Indeed, the pistol style housing permits easy aim and scanning of the desired RFID device 906a.

Figure 4:
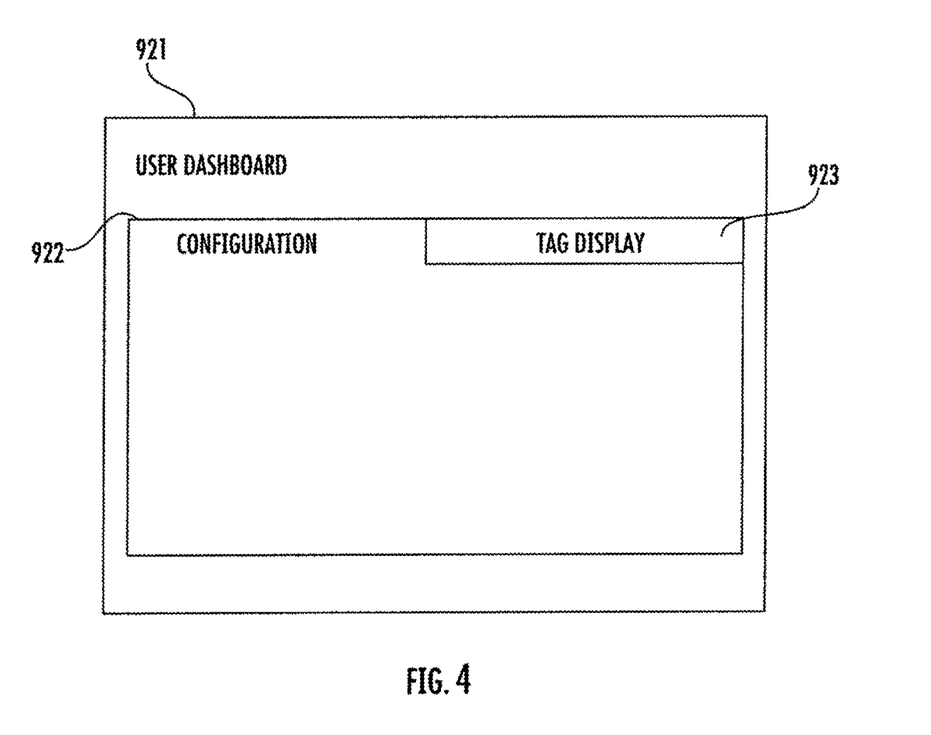
FIG. 4 is a schematic diagram a user dashboard interface, according to the present disclosure.

Referring now additionally to FIG. 4, in embodiments where the mobile wireless communications device 807, 907 includes a display, the user interface 921 for such device is now described. The user interface 921 illustratively includes a configuration tab 922, and a tag display tab 923.

Referring now additionally to FIG. 5, an exemplary embodiment of the RF antenna/RF transceiver 802-803 is now described. Here, the RF antenna and RF transceiver 802-803 are integrated on a system-on-chip (SoC). The RF antenna/RF transceiver 802-803 illustratively includes components 931-935.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A handheld radio frequency identification (RFID) reader comprising:
a housing;
a radio frequency (RF) antenna carried by said housing, said RF antenna comprising
a circular polarized antenna element, and
an RF absorber material under said circular polarized antenna element and configured to dampen a back lobe of a radiation pattern of said RF antenna, said housing defining a cavity directly under said RF absorber material;
an RF transceiver carried by said housing and being coupled to said RF antenna;
a controller carried by said housing and being coupled to said RF antenna and said RF transceiver;
a communication interface carried by said housing and coupled to said controller; and
a mobile wireless communications device carried by said housing and coupled to said communication interface, said mobile wireless communications device being configured to cooperate with said controller to receive data from an RFID device via said RF antenna.

2. The handheld RFID reader of claim 1 wherein said circular polarized antenna element comprises a spiral shaped antenna.

3. The handheld RFID reader of claim 1 wherein said communication interface comprises a wired communication interface.

4. The handheld RFID reader of claim 1 wherein said communication interface comprises a wireless communication interface.

5. The handheld RFID reader of claim 1 wherein said RF antenna is carried by an external surface of said housing.

6. The handheld RFID reader of claim 1 wherein said housing defines a device recess configured to receive said mobile wireless communications device.

7. The handheld RFID reader of claim 6 wherein said housing comprises a pistol style grip opposing said device recess.

8. The handheld RFID reader of claim 1 wherein said mobile wireless communications device is configured to communicate with an external database for storing the received data.

9. A communication system comprising:
a server; and
a handheld radio frequency identification (RFID) reader comprising
a housing,
a radio frequency (RF) antenna carried by said housing, said RF antenna comprising
a circular polarized antenna element, and
an RF absorber material under said circular polarized antenna element and configured to dampen a back lobe of a radiation pattern of said RF antenna, said housing defining a cavity directly under said RF absorber material,
an RF transceiver carried by said housing and being coupled to said RF antenna,
a controller carried by said housing and being coupled to said RF antenna and said RF transceiver, a communication interface carried by said housing and coupled to said controller, and a mobile wireless communications device carried by said housing and coupled to said communication interface, said mobile wireless communications device being configured to cooperate with said controller to receive data from an RFID device via said RF antenna, and communicate with an external database in said server for storing the received data.

10. The communication system of claim 9 wherein said circular polarized antenna element comprises a spiral shaped antenna.

11. The communication system of claim 9 wherein said communication interface comprises a wired communication interface.

12. The communication system of claim 9 wherein said communication interface comprises a wireless communication interface.

13. The communication system of claim 9 wherein said RF antenna is carried by an external surface of said housing.

14. The communication system of claim 9 wherein said housing defines a device recess configured to receive said mobile wireless communications device.

15. The communication system of claim 14 wherein said housing comprises a pistol style grip opposing said device recess.

16. A method of making a handheld radio frequency identification (RFID) reader, the method comprising:

forming a radio frequency (RF) antenna carried by a housing, the RF antenna comprising a circular polarized antenna element, and an RF absorber material under the circular polarized antenna element and configured to dampen a back lobe of a radiation pattern of the RF antenna, the housing defining a cavity directly under the RF absorber material;

coupling an RF transceiver, carried by the housing, to the RF antenna;

coupling a controller, carried by the housing, to the RF antenna and the RF transceiver;

coupling a communication interface, carried by the housing, to the controller; and coupling a mobile wireless communications device, to be carried by the housing, to the communication interface, the mobile wireless communications device being configured to cooperate with the controller to receive data from an RFID device via the RF antenna.

17. The method of claim 16 wherein the circular polarized antenna element comprises a spiral shaped antenna.

18. The method of claim 16 wherein the communication interface comprises a wired communication interface.

19. The method of claim 16 wherein the communication interface comprises a wireless communication interface.

20. The method of claim 16 wherein the RF antenna is carried by an external surface of the housing.

* * * * *